United States Patent
Edelmann et al.

(10) Patent No.: US 8,251,202 B2
(45) Date of Patent: Aug. 28, 2012

(54) SORTER

(75) Inventors: Klaus Edelmann, Worms (DE); Helge Ehrhardt-Caspers, Königswinter (DE)

(73) Assignee: Klaus Edelmann, Worms (DE)

( * ) Notice: Subject to any disclaimer, the term of this patent is extended or adjusted under 35 U.S.C. 154(b) by 257 days.

(21) Appl. No.: 12/520,228

(22) PCT Filed: Dec. 18, 2007

(86) PCT No.: PCT/EP2007/011082
§ 371 (c)(1),
(2), (4) Date: Dec. 31, 2009

(87) PCT Pub. No.: WO2008/074453
PCT Pub. Date: Jun. 26, 2008

(65) Prior Publication Data
US 2010/0175966 A1     Jul. 15, 2010

(30) Foreign Application Priority Data
Dec. 20, 2006    (DE) .................... 10 2006 060 303

(51) Int. Cl.
*B65G 47/00* (2006.01)
(52) U.S. Cl. ............. 198/445; 198/369.5; 198/436
(58) Field of Classification Search .......... 198/369.5, 198/436, 445
See application file for complete search history.

(56) References Cited

U.S. PATENT DOCUMENTS

| | | | | |
|---|---|---|---|---|
| 3,703,921 A * | 11/1972 | Hunter | ..................... | 164/130 |
| 4,349,097 A * | 9/1982 | Curti | ..................... | 198/369.5 |
| 4,527,936 A * | 7/1985 | Hartlieb | ..................... | 414/790.4 |
| 5,117,961 A * | 6/1992 | Nicholson | ..................... | 198/369.5 |
| 5,180,159 A * | 1/1993 | Malick | ..................... | 271/302 |
| 5,577,596 A * | 11/1996 | Van Essen | ..................... | 198/349 |
| 6,082,521 A * | 7/2000 | Maier et al. | ..................... | 198/349.6 |
| 6,179,113 B1 * | 1/2001 | Wunscher et al. | ..................... | 198/436 |
| 6,702,121 B2 * | 3/2004 | Linge et al. | ..................... | 209/707 |
| 6,889,815 B2 * | 5/2005 | Kanamori et al. | ..................... | 198/369.4 |

FOREIGN PATENT DOCUMENTS

| | | |
|---|---|---|
| DE | 295 11 788 U1 | 9/1995 |
| FR | 2 104 687 A | 4/1972 |
| WO | WO 2006/002156 A | 1/2006 |

* cited by examiner

*Primary Examiner* — Joseph A Dillon, Jr.
(74) *Attorney, Agent, or Firm* — Foley & Lardner LLP

(57) ABSTRACT

An apparatus for distributing goods delivered on one or more feeding conveyor belts onto two or more removal conveyor belts, wherein the feeding conveyor belts as well as the removal conveyor belts are subdivided into a plurality of individual conveyor belts which are arranged in parallel side by side and are driven jointly. A rotary table having an essentially circular contour and also comprising a plurality of parallel individual conveyor belts which are also allocated to a joint drive is positioned between the feeding and the removal conveyor belts, wherein the feeding and the individual removal conveyor belts each closely reach up to the individual conveyor belts of the rotary table and are, in essence, adjusted in their length to the circular contour of the rotary table.

10 Claims, 4 Drawing Sheets

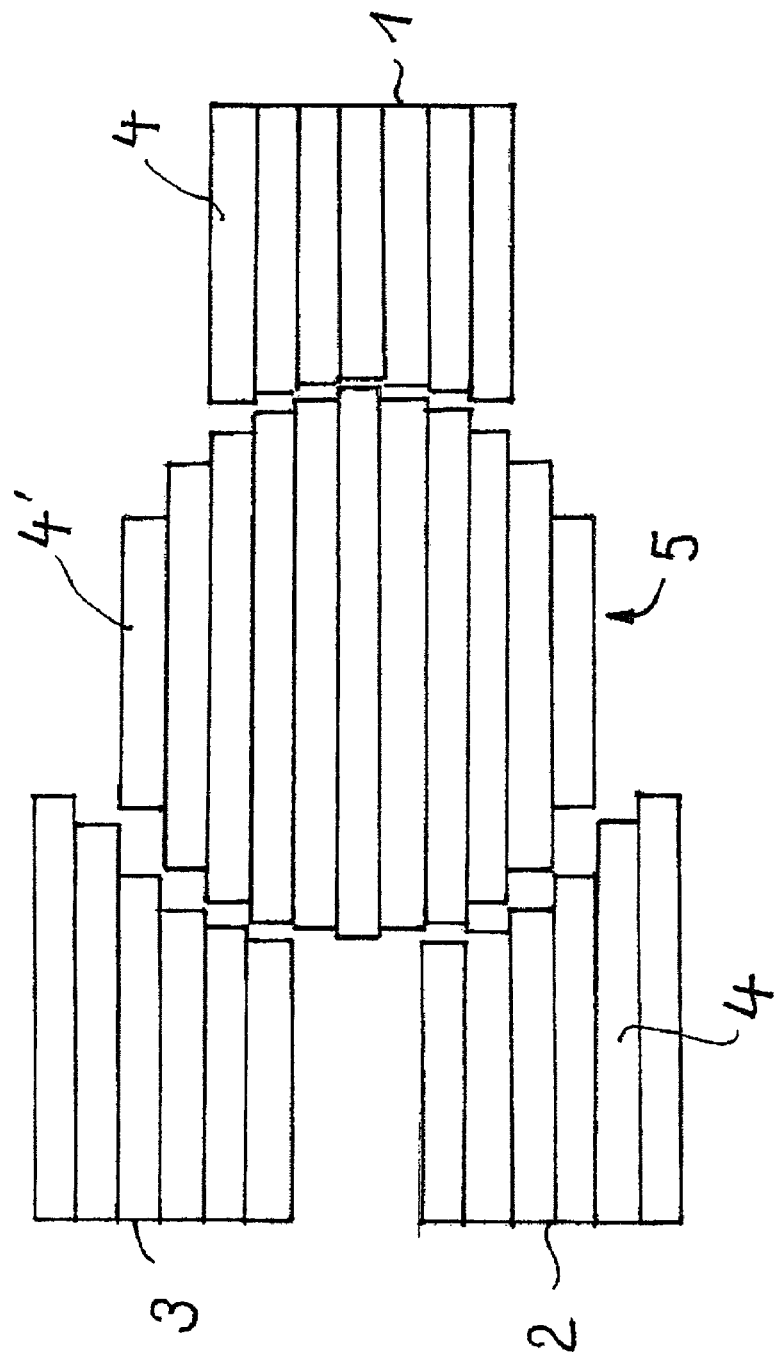

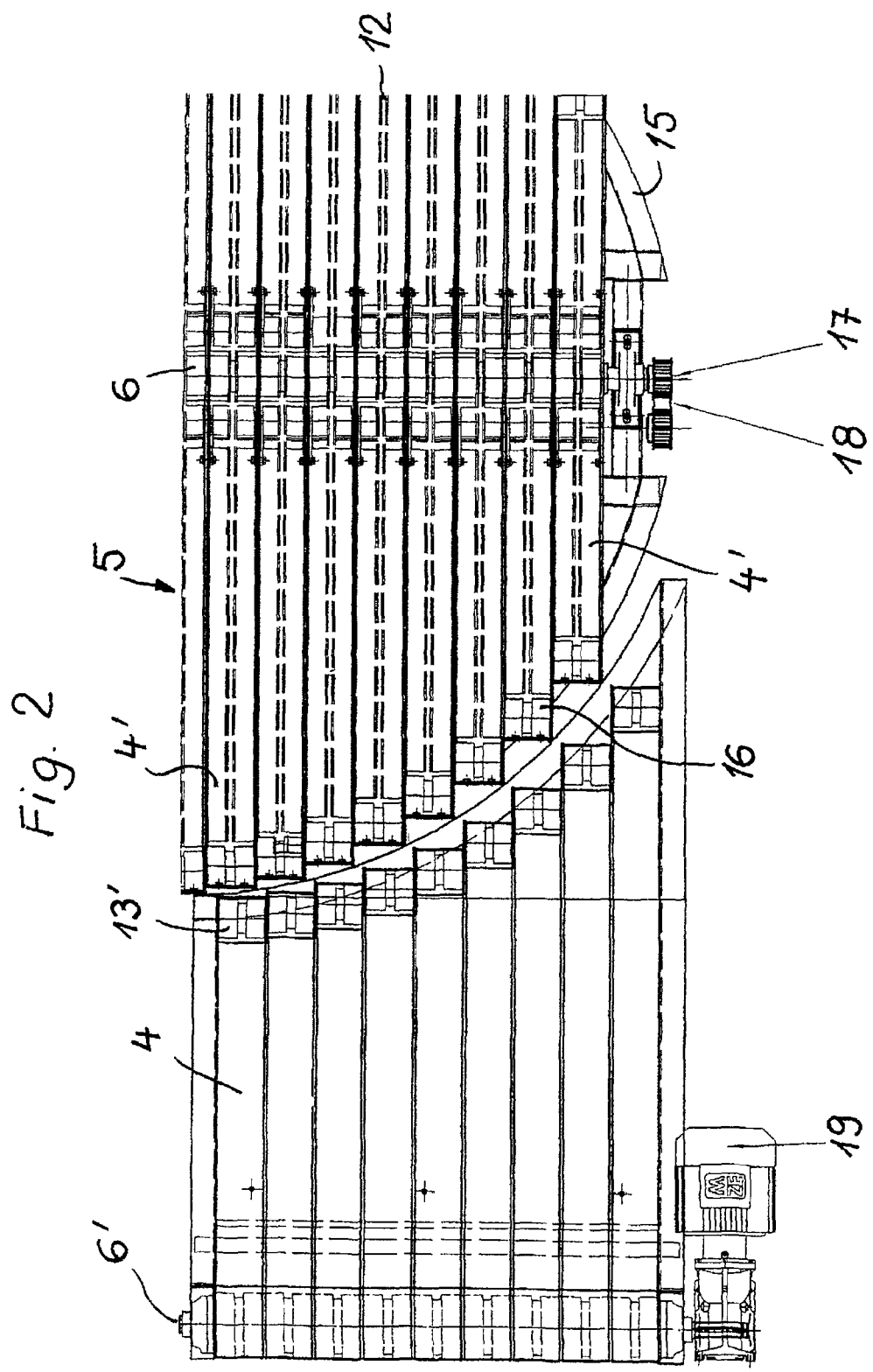

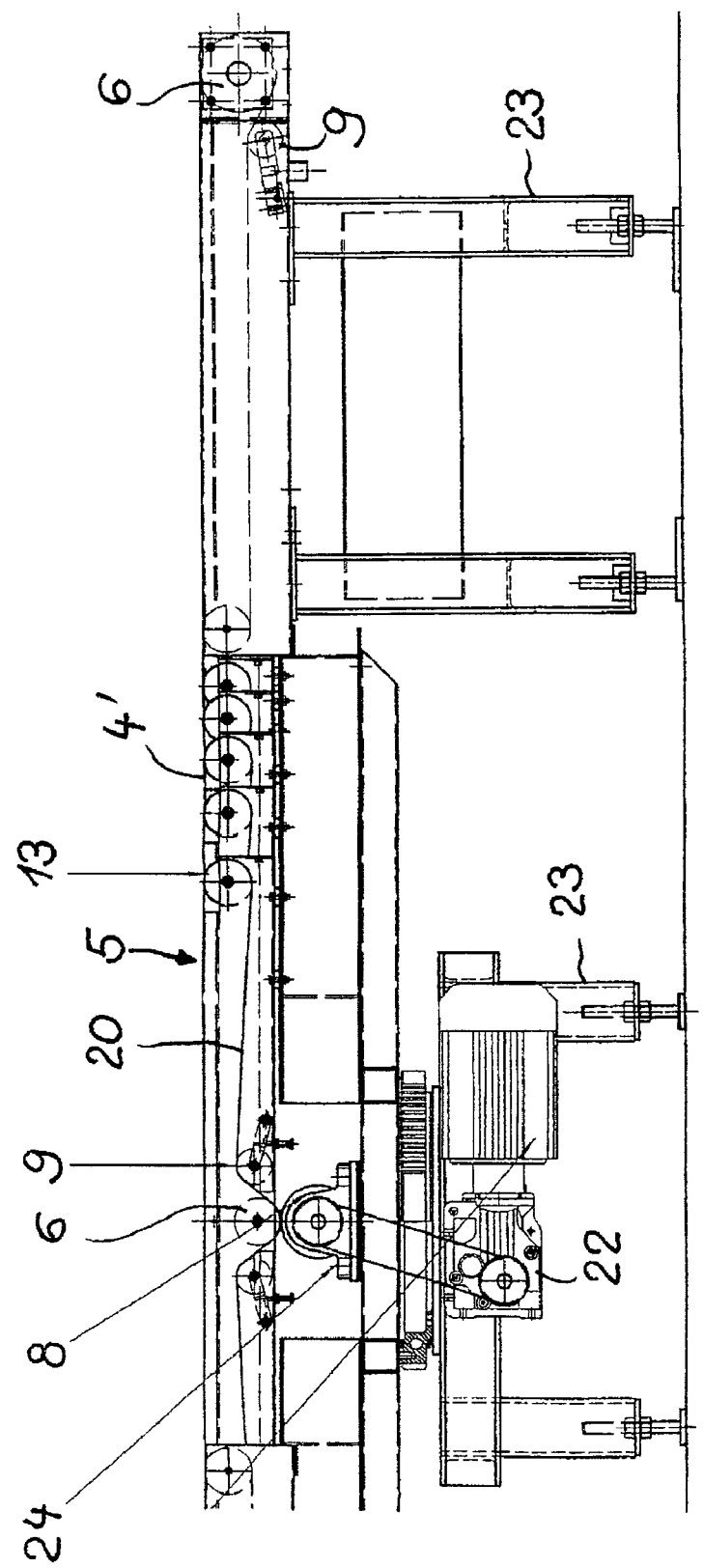

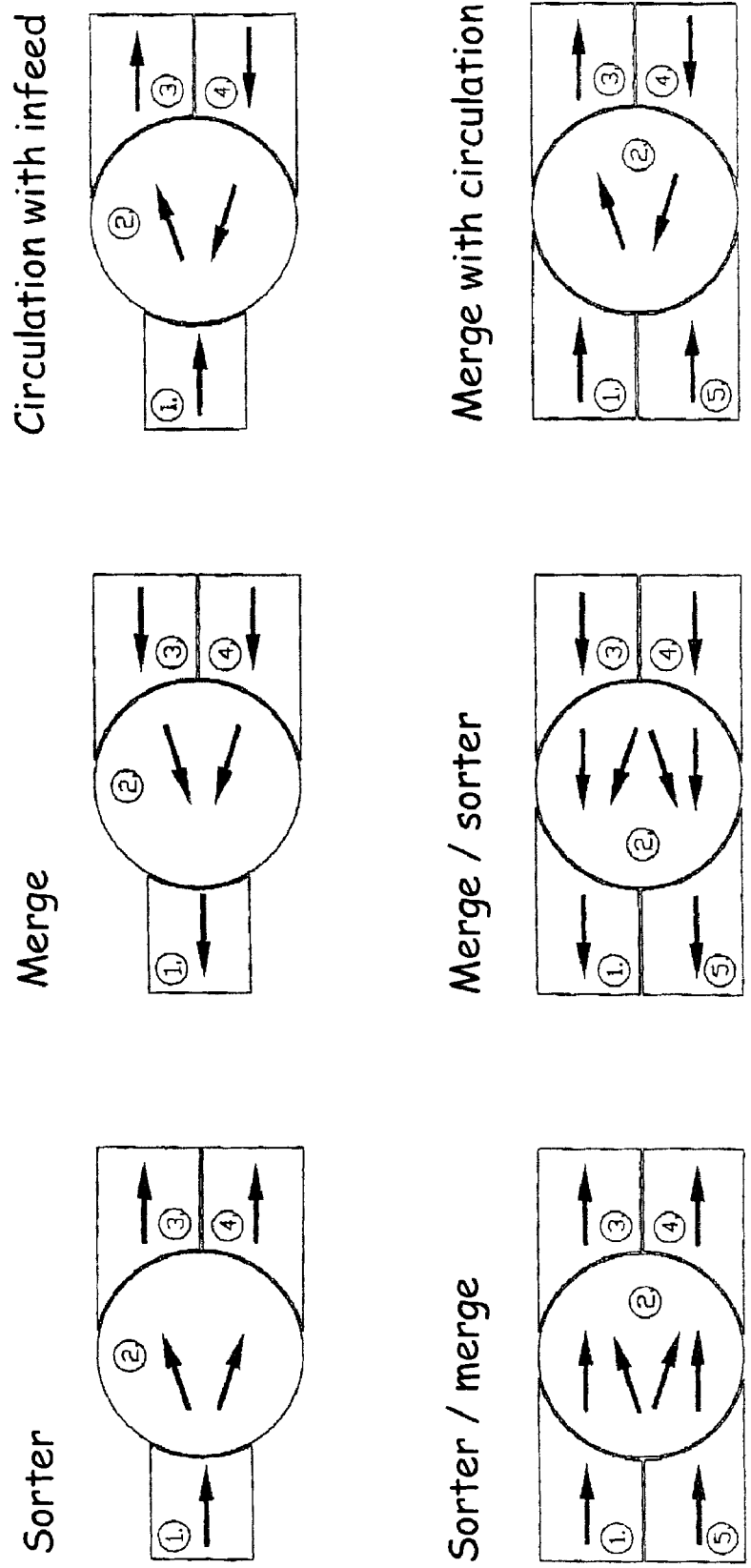

SORTER

The present invention relates to an apparatus and a method for distributing goods delivered on a feeding conveyor belt onto two or more removal conveyor belts.

It is known that the integrated and multifunctional method which can be reversed if necessary and the apparatuses for sorting, merging, injecting and changing the direction of belt-compatible goods required therefor present a considerable problem. The methods and apparatuses offered are only methods and apparatuses with single functions. For this reason, only reversible conveyors having only one or no more than two of the above-mentioned functions of the material flow have been used so far.

Hence, the above-mentioned basic functions are employed in logistic systems with different apparatuses and respective single methods accompanied by the disadvantages associated therewith, such as increased floor space required, higher acquisition costs and an inflexible development of the layout of the material flow systems.

Furthermore, it is known that goods, such as postal parcels, are transferred onto a distributor comprising a plurality of individually driven idler rollers the axis of which is rotated horizontally as required such that the goods are moved to the unloading belt respectively required. Addresses are registered prior to feeding onto the distributor, the distributor receives the corresponding information, and the appropriate dissolution is achieved by a plurality of distributors which are arranged in series.

This solution is disadvantageous in that the design of the distributor is complicated, the individual idler rollers must be swivelling horizontally as well as be driven separately, thus requiring mechanics that are relatively complex and susceptible to trouble.

For this reason, the present invention aims at creating a possibility for a design which is considerably simpler and particularly non-susceptible to trouble and which considerably reduces the number of breakdowns because such a solution also allows reaching noticeably longer maintenance intervals.

This problem is solved by means of an apparatus for distributing goods delivered on one or more feeding conveyor belts onto two or more removal conveyor belts, wherein the feeding conveyor belts and also the removal conveyor belts are subdivided into a plurality of individual conveyor belts which are arranged in parallel side by side and are driven jointly. A rotary table having an essentially circular contour and also comprising a plurality of parallel individual conveyor belts which are also allocated to a joint drive is positioned between the feeding and the removal conveyor belts, wherein the feeding and the individual removal conveyor belts each closely reach up to the individual conveyor belts of the rotary table and are, in essence, adjusted in their length to the circular contour of the rotary table.

On the one hand, the subdivision according to the invention into a plurality of individual conveyor belts both on the rotary table and on the feeding and removal conveyor belts provides the possibility of creating an approximately circular contour of the rotary table and the peripherally adjacent feeding and removal conveyor belts, with the result that said belts can be moved in relation to each other without excessively large gaps occurring, i.e. it is basically possible to put the feeding and removal conveyor belts into different positions in relation to each other as well. At the same time, however, this also opens up the possibility of driving all conveyor belts with one drive shaft each, with the result that the rotary table and the feeding and removal conveyor belts each also require only one motor.

Herein, the terms feeding and removal conveyor belts are chosen arbitrarily; if necessary, their function can be reversed as will be illustrated below in more detail.

Preferably, the feeding and removal conveyor belts are driven via a shaft which is arranged at the end of the belts facing away from the rotary table because, there, the shaft does not reach up to the periphery of the rotary table and, therefore, comprises a straight end edge which is defined by the strands guided around the shafts.

The conveyor belts of the rotary table are driven centrally and in transverse direction in relation thereto. To achieve this, it is suggested to have the particular slack strands of the individual conveyor belts engage underneath a shaft, wherein the drive is achieved by means of a countershaft which presses the slack strands onto the shaft, thus driving the individual conveyor belts under frictional contact.

In order to increase the friction of the conveyor belt in relation to the shaft, it is furthermore suggested to arrange tensioning rollers adjacent to the shaft, said tensioning rollers being loaded by a loaded spring and pressing the slack strand upwards on either side, thus considerably increasing the contact angle of the slack strand in relation to the shaft.

It is, of course, also possible to provide tensioning rollers adjacent to the output shafts for the conveyor belts of the feeding and removal units in analogous manner. Herein, a pairwise arrangement on either side is not provided because the contact angle is already 180°.

The relatively narrow individual conveyor belts comprise, for example, a width of 100 mm and are provided with a fillet strip on their inner side, said fillet strip extending in and being guided by means of corresponding cornices of the redirection or drive shafts.

The rotary table rests on a ring gear which meshes with a drive sprocket to put the former into the position desired. Therein, the motor for the countershaft is, of course, also moved wherein this drive is, preferably, achieved via a toothed belt.

The outer ends of the individual conveyor belts of the rotary table are supported on arc segments on which they are sliding or can be mounted via roller bearings; they can also be moved with said rotary table, provided there is an appropriate substructure.

The inner ends of the individual conveyor belts of the feeding and removal units are likewise supported on analog arc segments extending coaxially in relation to the rotary table. A typical embodiment of the invention comprises a diameter of the rotary table of approx. 1.7 m and is equipped with 17 individual conveyor belts, wherein 9 individual feeding and removal conveyor belts are provided at each of their units. Such an apparatus serves the purpose of distributing postal goods. Other fields of application require different geometries.

The individual conveyor belts of the feeding and removal units can be arranged adjacent to the rotary table both in a flush and an offset or radial manner, in particular also arranged transversely in relation to each other. Thus, the method according to the invention consists in that the parcel goods are placed onto a feeding conveyor belt which comprises a plurality of parallel individual conveyor belts, that the parcel goods are transfered from said feeding conveyor belt onto a rotary disk which also comprises a plurality of parallel synchronously moved individual conveyor belts, that the rotary table is turned into its desired position, and that the parcel goods are transfered from said desired position onto one of at least two removal conveyor belts which also comprise synchronously driven parallel individual conveyor belts. Thus, the invention serves a multifunctional utilization in material flow systems of belt-compatible goods, such as packets, which is preferably applied wherever, due to functional requirements, such as sorting, merging, injecting and direction changing processes (also reversible if necessary) as well as due to process and layout requirements in a physical planning respect, highly compact and space-saving methods and apparatuses are required for economic solutions with regard to the multifunctionality in material flow systems.

The suggested method contains a potential conjunction of all of the four above-mentioned basic functions in the material flow of belt-compatible parcel goods as well as only more than two of the above-mentioned basic functions and provides the possibility of integrating in a procedural manner and in one mechanism various functions which are possible in the material flow of belt-compatible parcel goods or, if necessary, required in the process in a space-saving manner by means of a multifunctional utilization of said one mechanism for said functions. Herein, the sorting, combining, injecting into an existing material flow (e.g. an existing parcel good circulation) and the changing in direction of belt-compatible parcel good streams for forming, e.g., a circulation, functional bundling of methods are combined within the apparatus accordingly suggested for this.

The present invention will be illustrated in more detail by means of the accompanying figures, wherein FIG. 1 is a top view of a schematic diagram of the invention, FIG. 2 shows the drive of the individual conveyor belts as well as the layout of the rotary table and a conveying unit, FIG. 3 is a front elevation of the apparatus in a detailed view, and FIG. 4 shows possibilities of operating the apparatus.

FIG. 1 shows three conveying units 1, 2, 3 and the rotary table 5 arranged therebetween. The conveying unit 1 can, for example, be used as feeding conveyor belt and the units 2, 3 as removal conveyor belts. As a matter of principle, the units 1, 2, 3 can be arranged around the rotary table 5 at any angles desired in relation to each other. Both the units 1, 2, 3 and the rotary table 5 comprise narrow conveyor belts 4' which are, for example, 100 mm in width and are each driven synchronously. If a packet (not shown) is fed in via the unit 1 and transferred to the rotary table 5, it is collected and moved forward by the conveyor belts 4'. Therein, the table 5 is turned into the direction desired in order to transfer the packet onto one of the units 2, 3 which, in this case, represent the removal conveyor belts. Further possibilities of distribution are illustrated under FIG. 4.

FIG. 2 also is a top view illustrating the layout of the rotary table 5 as well as a unit 2 which is, for example, a removal unit.

The individual conveyor belts 4' are driven via a central shaft 6; the conveyor belts 4' are guided via terminal separate idler rollers 13 which are each arranged in a staggered manner in relation to each other while following the periphery of the table.

The idler rollers 13 have central grooves 16 in which fillet strips 12 applied to the bottom side of the conveyor belts are running to center the conveyor belts 4'.

The conveyor belts 4' are supported on a round strip 15, wherein they can be running on or are rotating with said round strip 15.

The shaft 6 is driven via gear wheels 17 as well as a toothed belt 18.

The conveyor belts 4 also have fillet strips on their bottom side and are also running via end rollers 13' which are arranged staggered in relation to each other such that they are approximated to the periphery of the rotary table 5 while being spaced apart therefrom by a short distance.

Herein, the drive is achieved via a motor 19 which drives a terminal shaft 6', wherein this shaft 6' is grooved just like the idler rollers 13' and the conveyor belts, herein, also comprise fillet strips.

FIG. 3 shows the drive according to the invention of the conveyor belts 4' of the rotary table 5 as well as the staggered terminal rollers 13 on the right-hand side.

The slack strands 20 engage underneath the shaft 6 and are pressed against the shaft 6 by a countershaft 8 mounted in a bearing 24 in order to establish frictional contact. Tensioning rollers 9 pressing the slack strands 20 upwards and providing for an increased contact angle are positioned adjacent to the shaft 6.

The rotary table 5 rests on a motor-driven ring gear 21 which also carries the motor 22 for the output of the countershaft 8, wherein the shaft 6 can, as a matter of principle, be driven in a positive manner.

The ring gear 21 rests on a rack 23. In the unit 1 which is shown to the right and is, for example, used as feeding conveyor belt, it is indicated that a tensioning roller 9 can also be allocated to the drive shaft 6'. The units for the feeding and removal conveyor belts rest on their own racks 23. The reference symbol 22 is allocated to the motor for driving the ring gear 21.

FIG. 4 illustrates the principle of redirection of goods, such as in particular packets, with, for example, three (first row) and four units for feeding and removal conveyance in longitudinal direction. As a matter of course, further units extending in transverse direction in relation thereto can be arranged adjacent thereto.

Therein, it can be recognized that the conveying directions indicated by the arrows can also be reversed if necessary. Furthermore, it is indicated that the rotary table is not restricted to a swivel motion to the right/left but can also be operated in a circulation.

LIST OF REFERENCE SYMBOLS

1 Feeding conveyor belt
2, 3 Removal conveyor belts
4, 4' Individual conveyor belts
5 Rotary table
6, 6' Shaft
7 Slack strands
8 Countershaft
9 Tensioning rollers
10 Ring gear
11 Rack
12 Strips
13, 13' Terminal rollers
14 Cornices
15 Round strip
16 Grooves
17 Gear wheels
18 Toothed belt
19 Motor
20 Slack strand
21 Ring gear
22 Motor
23 Rack
24 Bearing

The invention claimed is:

1. An apparatus for distributing goods delivered on one or more feeding conveyor belts onto two or more removal conveyor belts, comprising:

one or more feeding conveyor belts;

two or more removal conveyor belts, wherein both the one or more feeding conveyor belts and the two or more removal conveyor belts are subdivided into a individual conveyor belts which are arranged in parallel side by side and are each driven jointly;

a rotary table which is pivoted on a ring gear meshing with a drive sprocket and which includes an essentially circular contour, the rotary table positioned between the one ore more feeding conveyor belts and the two or more removal conveyor belts, wherein the rotary table further includes parallel individual conveyor belts, allocated to a joint drive, wherein each of the one or more feeding conveyor belts and the two or more removal conveyor belts closely reach up to the individual conveyor belts of the rotary table and are adjusted in their length to the essentially circular contour of the rotary table, wherein the individual conveyor belts of the rotary table are driven via a joint shaft, wherein slack stands of the individual conveyor belts of the rotary table engage underneath the joint shaft and are driven via a countershaft under frictional contact, and wherein the apparatus is configured to operate in a reversible manner.

2. The apparatus according to claim 1, wherein the joint shaft extends centrally and in a transverse direction in relation to the individual conveyor belts of the rotary table.

3. The apparatus according to claim 2, wherein pairwise tensioning rollers are arranged adjacent to the joint shaft, said pairwise tensioning rollers pressing the individual conveyor belts of the rotary table upwards, thus increasing a contact angle with an increase in friction.

4. The apparatus according to claim 1, wherein tensioning rollers are allocated to terminal rollers of the individual conveyor belts of the rotary table.

5. The apparatus according to claim 1, wherein individual conveyor belts comprise central strips on an inner side of the individual conveyor belts, said central strips running via terminal rollers which comprise cornices guiding the terminal rollers.

6. The apparatus according to claim 1, wherein the ring gear is supported on a rack.

7. The apparatus according to claim 1, wherein each of the individual conveyor belts of the one or more feeding conveyor belts, the two or more removal conveyor belts and the rotary table comprise a width of 100 mm.

8. A method for distributing parcel goods, comprising the following steps:
   a) feeding parcel goods onto at least one feeding conveyor belt,
   b) transferring the parcel goods onto a rotary table which is positioned between the at least one feeding conveyor belt and two or more removal conveyor belts, wherein the rotary table is pivoted on a ring gear meshing with a drive sprocket and includes an essentially circular contour, wherein the rotary table further includes parallel individual conveyor belts which are driven via a joint shaft, and slack strands of the individual conveyor belts of the rotary table engage underneath the joint shaft and are driven via a countershaft under frictional contact;
   c) transferring the parcel goods from the rotary table onto at least one of the two or more removal conveyor belts; and
   d) jointly driving each of the individual conveyor belts of the rotary table which are arranged in parallel side by side and are driven jointly, with the at least one feeding conveyor belt, the two or more removal conveyor belts, and the rotary table consisting of the individual conveyor belts wherein said rotary table and each of said belts are configured to operate in a reversible manner.

9. The method according to claim 8, comprising the following steps:
   e) reversing a conveying direction of at least one of the at least one feeding conveyor belt and the two or more removal conveyor belts.

10. The method according to claim 8, wherein conveyance comprises at least one of distributing, merging, circulating or a combination of a plurality of the aforementioned steps.

* * * * *